US010380349B2

(12) United States Patent
Tripp

(10) Patent No.: US 10,380,349 B2
(45) Date of Patent: *Aug. 13, 2019

(54) SECURITY ANALYSIS USING RELATIONAL ABSTRACTION OF DATA STRUCTURES

(71) Applicant: International Business Machines Corporation, Armonk, NY (US)

(72) Inventor: Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/620,464

(22) Filed: Jun. 12, 2017

(65) Prior Publication Data

US 2017/0286693 A1    Oct. 5, 2017

Related U.S. Application Data

(63) Continuation of application No. 14/026,318, filed on Sep. 13, 2013, now Pat. No. 9,690,946, which is a continuation of application No. 13/676,942, filed on Nov. 14, 2012, now Pat. No. 9,690,945.

(51) Int. Cl.
G06F 9/44        (2018.01)
G06F 21/57       (2013.01)
G06F 11/36       (2006.01)

(52) U.S. Cl.
CPC ........ G06F 21/577 (2013.01); G06F 11/3672 (2013.01); G06F 2221/034 (2013.01)

(58) Field of Classification Search
CPC .................................................. G06F 11/3672
See application file for complete search history.

(56) References Cited

U.S. PATENT DOCUMENTS

| 7,100,195 | B1 | 8/2006 | Underwood |
| 7,945,657 | B1 | 5/2011 | McDougall et al. |
| 9,650,945 | B2 | 6/2017 | Tripp |
| 9,650,946 | B2 | 6/2017 | Tripp |
| 2003/0154204 | A1 | 8/2003 | Chen-Wright et al. |

(Continued)

FOREIGN PATENT DOCUMENTS

| JP | 06-103058 A | 4/1994 |
| JP | 2011018376 A | 1/2011 |

OTHER PUBLICATIONS

Xiao, X. et al., "Tracking Data Structures for Postmortem Analysis (NIER Track)", In Proc. of 33rd Int'l. Conf. on Software Engineering ICSE '11, May 21, 28, 2011, pp. 896-899, retrieved from the Internet: <www.cse.ust.hk/~richardxx/papers/track_nier11.pdf>.

(Continued)

Primary Examiner — Hang Pan
(74) Attorney, Agent, or Firm — Cuenot, Forsythe & Kim, LLC

(57) ABSTRACT

Analyzing program code can include detecting an instance of a container within the program code using a processor, selecting a model container correlated with the container using the processor, and creating an instance of the model container within memory using the processor. A data-flow of the program code can be tracked through the instance of the model container instead of the instance of the container.

20 Claims, 3 Drawing Sheets

(56) References Cited

U.S. PATENT DOCUMENTS

| | | | |
|---|---|---|---|
| 2006/0070089 A1* | 3/2006 | Shoaib | G06F 9/4411 719/321 |
| 2007/0083933 A1 | 4/2007 | Venkatapathy et al. | |
| 2007/0162890 A1 | 7/2007 | Meier et al. | |
| 2007/0240138 A1 | 10/2007 | Chess et al. | |
| 2007/0283328 A1* | 12/2007 | Javed | G06F 9/44521 717/127 |
| 2008/0016496 A1* | 1/2008 | Li | G06F 11/3624 717/124 |
| 2009/0240714 A1 | 9/2009 | Keith et al. | |
| 2009/0282392 A1 | 11/2009 | Russell | |
| 2010/0192194 A1 | 7/2010 | Tan et al. | |
| 2010/0306749 A1 | 12/2010 | Rioux | |
| 2011/0145795 A1 | 6/2011 | Khanapurkar et al. | |
| 2011/0145918 A1 | 6/2011 | Jung et al. | |
| 2012/0042384 A1 | 2/2012 | Badhwar et al. | |
| 2014/0137084 A1 | 5/2014 | Tripp | |
| 2014/0137256 A1 | 5/2014 | Tripp | |

OTHER PUBLICATIONS

Pheng, S. et al., "Dynamic Data Structure Analysis for Java Programs" 14th IEEE Int'l. Conf. on Program Comprehension ICPC 2006, 2006, pp. 191-201, retrieved from the Internet: <http://www.sable.mcgill.ca/publications/papers/2006-1/pheng-06-dynamic.pdf>.

Yip, A. et al., "Improving Application Security With Data Flow Assertions," Proc. of the ACM SIGOPS 22nd Sym. on Operating Systems Principles SOSP '09, Oct. 11-14, 2009, pp. 291-304, retrieved from the Internet: <http://dl.acm.org/citation.cfm?id=1629604>.

"Wala T.J. Watson Libraries for Analysis," [online] WALA Wiki, retrieved Jul. 13, 2012, 2 pgs., retrieved from the Internet: <http://wala.sourceforge.net/wiki/index.php/Main_Page>.

"Soot: A Java Optimization Framework," [online] Sable McGill, Jan. 22, 2012, 4 pgs., retrieved from the Internet: http://www.sable.mcgill.ca/soot/>.

Hawkins, P. et al., "Data Representation Synthesis," ACM SIGPLAN Notices—PDLI '11, vol. 45, No. 6, Jun. 2011, pp. 38-49, retrieved from the Internet: <http://theory.stanford.edu/~hawkinsp/papers/pldi2011synthesis.pdf>.

Paige, R. et al., "Mechanical Translation of Set Theoretic Problem Specifications into Efficient RAM Code—A Case Study," Journal of Symbolic Computation, vol. 4, pp. 207-232, 1987 retrieved from the Internet: <http://www.diku.dk/hjemmesider/ansatte/henglein/papers/paige1986.pdf>.

"JCHORD, A Static and Dynamic Program Analysis Platform for Java," [online] Google Project Hosting, 1 pg., [retrieved Nov. 14, 2012] retrieved from the Internet: <http://code.google.com/p/jchord/>.

"Chord: A Program Analysis Platform for Java," [online] Program Analysis Group at Georgia Tech, 3 pgs. [retrieved Nov. 4, 2012] retrieved from the Internet: <http://pag.gatech.edu/chord>.

U.S. Appl. No. 13/676,942 Non-Final Office Action, dated Jan. 27, 2015, 11 pg.

U.S. Appl. No. 13/676,942 Final Office Action, dated May 14, 2015, 13 pg.

U.S. Appl. No. 13/676,942 Non-Final Office Action, dated Apr. 12, 2016, 11 pg.

U.S. Appl. No. 13/676,942 Final Office Action, dated Jul. 22, 2016, 12 pg.

U.S. Appl. No. 13/676,942 Notice of Allowance, dated Feb. 22, 2017, 10 pg.

U.S. Appl. No. 14/026,318 Non-Final Office Action, dated Jan. 27, 2015, 10 pg.

U.S. Appl. No. 14/026,318 Final Office Action, dated May 14, 2015, 12 pg.

U.S. Appl. No. 14/026,318 Non-Final Office Action, dated Apr. 11, 2016, 10 pg.

U.S. Appl. No. 14/026,318 Final Office Action, dated Jul. 22, 2015, 12 pg.

U.S. Appl. No. 14/026,318 Notice of Allowance, dated Feb. 23, 2017, 8 pg.

* cited by examiner

300
```
1  String username = webRequest.getParameter("username"); //
2  String middleName = webRequst.getParameter("middlename"); //
3  Map m = new HashMap();
4  if (middleName == null)
5        m.put("middlename", "N/A");
6  else
7        username = username+middlename;
8  m.put("username", username);
       …
9  String midname = m.get("middlename");
10 if (midname != null)
11       DBUtil.write("No middlename: " + midname); //
```
FIG. 3
400
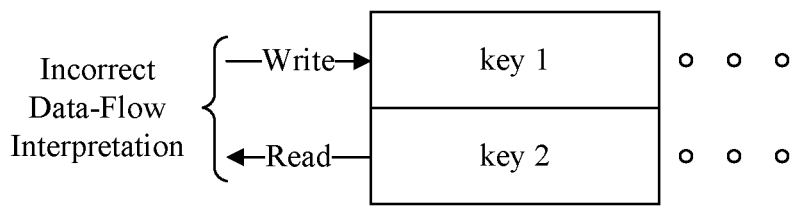
FIG. 4
500
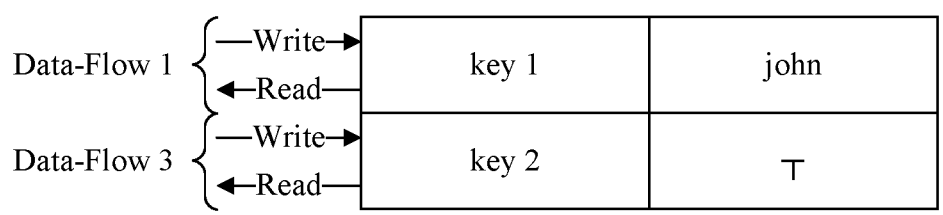
FIG. 5

SECURITY ANALYSIS USING RELATIONAL ABSTRACTION OF DATA STRUCTURES

BACKGROUND

Security analysis is a topic of great importance for application program development. In many cases, security analysis for an application program is reduced to a data-flow problem. The application program that is undergoing security testing is represented as a data-flow graph. Representing the application program as a series of data-flows allows one to observe the flow of data into and out from various areas of the application program (or computing environment) to better identify security vulnerabilities.

Examples of security vulnerabilities include those relating to system integrity and data confidentiality. An integrity-related vulnerability involves the flow of data from an untrusted source to a security-sensitive area of the application program. A confidentiality-related vulnerability relates to the flow of trusted data into a public or unprotected area of the application program which may allow untrusted third parties to access the data.

A number of factors impede security analysis. One factor is the large scale of modern application programs such as Web-based applications, network-based applications, and the like. Tracking data-flows through such large systems is difficult. Another factor is the use of data structures, referred to as "containers," which tend to obfuscate the flow of data within the application program under test. In many cases, it is not feasible to accurately tracking a data-flow through a container due to significant complexity of the container. These impediments to security analysis often result in the test system generating one or more false positives for security vulnerabilities when testing program code.

BRIEF SUMMARY

A method of analyzing program code includes detecting an instance of a container within the program code using a processor, selecting a model container correlated with the container using the processor, creating an instance of the model container within memory using the processor, and tracking a data-flow of the program code through the instance of the model container instead of the instance of the container.

A system for analyzing program code includes a processor programmed to initiate executable operations. The executable operations include detecting an instance of a container within the program code, selecting a model container correlated with the container, creating an instance of the model container within memory, and tracking a data-flow of the program code through the instance of the model container instead of the instance of the container.

A computer program product for analyzing program code includes a computer readable storage medium having program code embodied therewith. The program code is executable by a processor to perform a method. The method includes detecting an instance of a container within program code using a processor, selecting a model container correlated with the container using the processor, creating an instance of the model container within memory using the processor, and tracking a data-flow of the program code through the instance of the model container instead of the instance of the container.

BRIEF DESCRIPTION OF THE SEVERAL VIEWS OF THE DRAWINGS

FIG. 3 is an example of program code under test.

FIG. 4 illustrates an example of an incorrect data-flow interpretation by a conventional test system.

FIG. 5 illustrates an exemplary instance of a model container.

DETAILED DESCRIPTION

Figure 1:
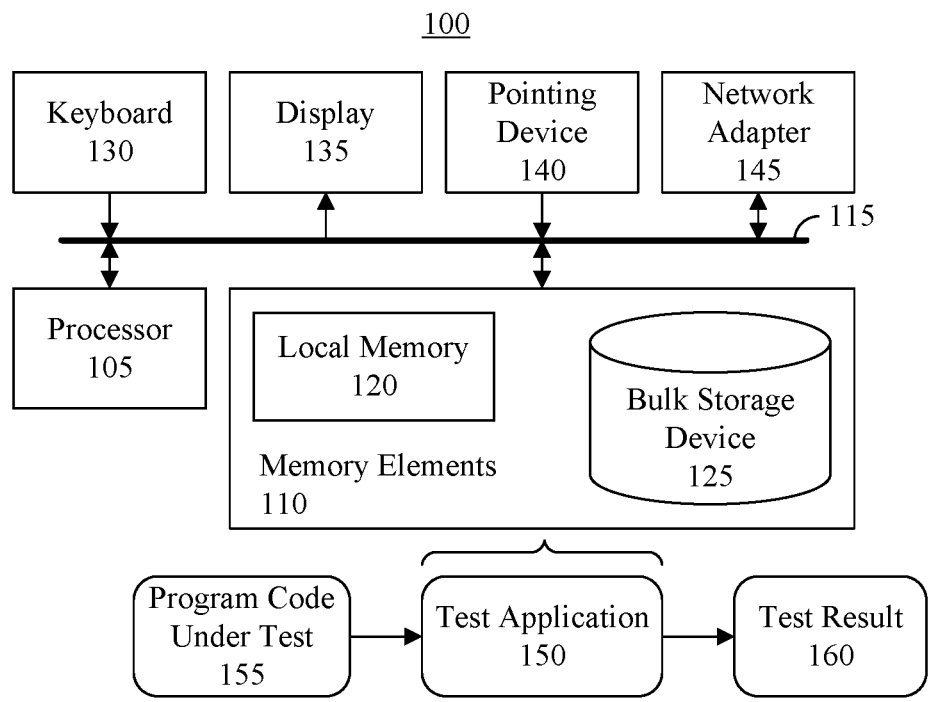
FIG. 1 is a block diagram illustrating an exemplary data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium refers to a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium is any tangible medium that contains or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments disclosed within this specification relate to testing program code and, more particularly, to security testing of program code. In accordance with the inventive arrangements disclosed within this specification, a data structure, referred to as a "container," that is used within program code undergoing testing is correlated with a model container. The model container is a relational abstraction of the actual container. Use of the model container facilitates more accurate tracking of data-flows into and out of the model container than is attainable using the actual container. In many instances, potential security vulnerabilities of the program code are detected more reliably with fewer false positives using a container model than when using the actual container.

FIG. 1 is a block diagram illustrating an exemplary data processing system (system) 100. System 100 implements a testing system configured to test program code for one or more security vulnerabilities. As pictured, system 100 includes one or more processors, e.g., central processing units, illustrated as processor 105. Processor 105 is coupled to memory elements 110 through a system bus 115 or other suitable circuitry. As such, system 100 can store program code within memory elements 110.

Processor 105 executes the program code accessed from memory elements 110 via system bus 115. In one aspect, system 100 is implemented as a computer or other programmable data processing apparatus suitable for storing and/or executing program code. It should be appreciated, however, that system 100 can be implemented in the form of any system including a processor and memory that is capable of performing the functions and/or operations described within this specification.

Memory elements 110 can include one or more physical memory devices such as, for example, local memory 120 and one or more bulk storage devices 125. Local memory 120 refers to RAM or other non-persistent memory device(s) generally used during actual execution of the program code. Bulk storage device(s) 125 can be implemented as a hard disk drive (HDD), solid state drive (SSD), or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally can be coupled to system 100. The I/O devices can be coupled to system 100 either directly or through intervening I/O controllers. One or more network adapters 145 also can be coupled to system 100 to enable system 100 to become coupled to other systems, computer systems, remote printers, and/or remote storage devices through intervening private or public networks. Modems, cable modems, and Ethernet cards are examples of different types of network adapters 145 that can be used with system 100.

As pictured in FIG. 1, memory elements 110 can store a test application 150. Test application 150, being implemented in the form of executable program code, is executed by system 100 and, as such, is considered an integrated part of system 100. As shown, system 100, by way of executing test application 150, operates upon program code under test 155. Program code under test 155 represents a computer program or portion thereof that is undergoing testing by system 100. System 100 outputs a test result 160 as a consequence of performing testing and, more particularly, security testing upon program code under test 155. Test result 160 indicates whether program code under test 155 includes one or security vulnerabilities as determined by the testing performed by system 100.

Within this specification, "outputting" and/or "output" means storing in memory elements 110, writing to a file stored in memory elements 110, writing to display 135 or other peripheral output device, sending or transmitting to another system, exporting, or the like. It should be appreciated that test application 150, program code 155, and test result 160 are functional data structures that impart functionality when employed as part of system 100 or another appropriate system.

As part of the testing performed upon program code under test 155, system 100 performs data-flow analysis. Data-flow analysis is a technique for gathering information about values calculated at various points in program code under test 155. As part of the testing performed, system 100, for example, generates a control-flow graph (CFG). The CFG specifies the particular data flowing into nodes and/or data flowing out of nodes of program code under test 155.

In general, nodes of the CFG represent either source statements or sink statements. A source statement is an instruction of program code under test 155 that receives an input from a user (i.e., a "user input"). A user input is considered untrusted data since the user input can include malicious content. A sink statement refers to an instruction of program code under test 155 that performs what is considered or designated as a "sensitive operation." An example of a sink statement is an instruction that writes data to a location such as a database or the like that is considered to be sensitive. In one aspect, a sensitive location is any data structure used or accessed by program code under test 155 or another system in which the data that is to be written is presumed to be safe.

System 100 checks each data-flow from a source statement to a sink statement, as represented by the CFG derived from program code under test 155, to check whether the data-flow includes a sanitizer. A sanitizer refers to a method that checks an untrusted user input for the presence of malicious content, e.g., strings interpretable as code, and/or removes the malicious content from the user input. Each path between a source statement and a sink statement that does not have a sanitizer is considered a security vulnerability.

In many cases, programs utilize containers. A "container" refers to a data structure that, once an instance is created, is stored within a memory (e.g., a memory as described with reference to FIG. 1). A container can be any of a variety of different types. The type of the data structure defines the organizing principles governing the container and how the data is manipulated. Examples of different container types include Hashmaps, Vectors, Sets, arrays, or the like. An access of a container refers to any operation performed upon an instance of the container. Examples of accesses include operations such as a read from an instance of a container, a write (which includes a modification) to an instance of a container, a deletion of data from an instance of a container, or the like.

As such, use of a container is a likely occurrence in many paths of a CFG. In some cases, the inclusion of a container, however, often convolutes data-flow analysis. The complexity of the operations used to support a container, e.g., the optimized library implementing a container and/or the various supporting operations for the container, results in a conventional test system losing track of data-flows through the container. As a result of this complexity, conventional test systems tend to become overly conservative in determining whether security vulnerabilities exist. Conventional test systems tend to overstate the existence of security vulnerabilities. A declared security vulnerability by a test system where no security vulnerability exists is called a "false positive."

In illustration, consider the case in which a conventional test system detects data being stored within an instance of a container (a data "in-flow") and data being read from the instance of the container (a data "out-flow"). In many instances, the conventional test system is unable to determine whether the in-flow and the out-flow access a same location (or use a same key) within the instance of the container and, as such, are part of the same data-flow. Often, the conventional test system incorrectly assumes that the in-flow and the out-flow are part of the same data-flow. As such, a write to a first location within the instance of the container and a read from a second and different location in the instance of the container, which are indicative of two separate and distinct data-flows, are interpreted as belonging to a single data-flow. Because of this inability to track data-flows through containers, the conventional test system may simply presume that any data read from the instance of the container is untrusted. As such, any data obtained from the instance of the container that is provided to a sink statement is interpreted as a security vulnerability regardless of whether such a vulnerability actually exists (the data is not untrusted).

Figure 2:
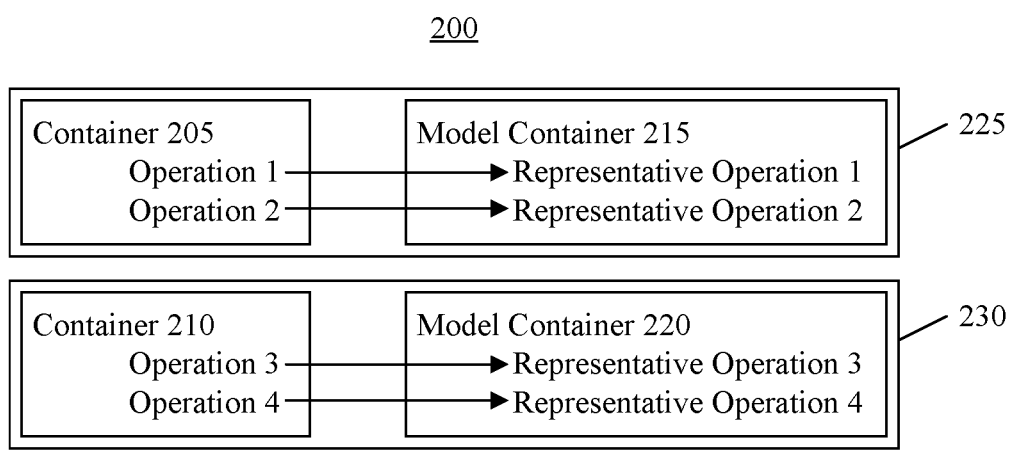
FIG. 2 is a block diagram illustrating an exemplary mapping 200 of containers to model containers.

FIG. 2 is a block diagram illustrating an exemplary mapping 200 of containers to model containers. FIG. 2 illustrates mapping 200, which is either accessed by test application 150 (and thus system 100) of FIG. 1 or included as part of test application 150. Mapping 200 illustrates an association between actual containers available for use by program code 155 and relational abstractions of such containers, referred to as model containers, that are used for purposes of data-flow analysis by system 100. In another aspect, each specification further includes a list of supporting operations for the container and corresponding representative operations for the associated model container.

As pictured in FIG. 2, mapping 200 includes two specifications 225 and 230. Specification 225 indicates that container 205 is associated (or correlated) with model container 215. Specification 230 indicates that container 210 is associated with model container 220. Typically, each container is associated with one or more operations that are used to access data for an instance of the container. Such operations can be referred to as the supporting operations for the container.

Operations typically vary according to container type. For instance, "put" and "get" are exemplary supporting operations typically available for use with a "HashMap" type of container. A "put" operation is a type of write operation. A "get" operation is a type of read operation. "Add" (a type of write operation) and "remove" (a type of read operation) are exemplary operations typically available for a "Set" type of container. A use of a container within program code under test is detectable by virtue of the creation of a container and/or an access of an instance of the container (i.e., execution of a supporting operation for the container).

Within FIG. 2, container 205 is associated with operation 1 and operation 2, which are supporting operations. Container 210 is associated with operation 3 and operation 4, which are supporting operations. For purposes of illustration, if container 205 is a "HashMap" type of container, operations 1 and 2 can represent "put" and "get" operations. If container 210 is a "Set" type of container, operations 3 and 4 can represent "add" and "remove" operations.

Each model container is also associated with one or more representative operations. A representative operation is a supporting operation for the model container. Each representative operation is "representative" of a corresponding supporting operation for the associated container. Put another way, a representative operation of a model container is associated with an operation of the particular container to which the model container is associated.

Referring again to FIG. 2, as noted, container 205 is associated with model container 215. Model container 215 includes representative operation 1 and representative operation 2, which are supporting operations for model container 215. Operation 1 of container 205 is associated with representative operation 1. Operation 2 of container 205 is associated with representative operation 2. Container 210 is associated with model container 220. Model container 220 includes representative operation 3 and representative operation 4, which are supporting operations of model container 220. Operation 3 of container 210 is associated with representative operation 3. Operation 4 of container 210 is associated with representative operation 4.

Each model container is a relational abstraction of the particular container with which the model container is associated. Thus, model container 215 is a relational abstraction of container 205. When system 100 encounters a container within the program code under test, system 100 utilizes the model container corresponding to the encountered container in order to analyze data-flows. Rather than utilize the complex operations of the container, each model container stores data in the form of tuples. Thus, representative operations are configured to manipulate tuples and avoid the complexity of the corresponding container. Each tuple is formed of a key and a corresponding value. By using only tuples in the model containers, a data-flow through a model container can be tracked with greater ease and clarity than a data-flow through the corresponding container.

Thus, during analysis of program code under test 155, system 100 detects containers. When a container is detected, system 100 uses a model container associated with the detected container for purposes of analyzing data-flow. As an example, when system 100 detects container 205, system 100 uses model container 215. Rather than analyzing operation 1, for example, which supports container 205, system 100 determines, from specification 225, that representative operation 1 should be used instead. System 100 then analyzes representative operation 1 in lieu of executing the operation 1 associated with container 205. When using representative operation 1, however, actual input values that would have been used by operation 1 are used as arguments for representative operation 1 and evaluated.

FIG. 3 is an example of program code under test (program code) 300. Program code 300 is specified as source code. Source code refers to program code in human readable format. In some cases, source code requires compilation, e.g., translation into a different format such as object code, before execution by a processor. In other cases, the source code must be translated into another format that is interpretable by a processor, e.g., bytecode or the like. In still another example, source code, when specified as a script, is directly interpretable by a processor.

In any case, program code 300 includes 11 lines of program code. System 100 can analyze program code 300 and, in doing so, generate a CFG in which one or more instructions are identified as source statements and one or more instructions are identified as sink statements.

Line 1 refers to an instruction that receives a user specified input. As such, line 1 is identified as a source statement. Line 1 stores the received user input parameter called "username" in the string "username." Similarly, line 2 refers to an instruction that receives a user specified input. As such, line 2 is identified as another source statement. Line 2 stores the received user input parameter called "middlename" in the string "middleName." For purposes of illustration, database operations such as line 11 are determined to be sensitive. As such, line 11 is identified as a sink statement.

In line 3, an instance "m" of a HashMap type of container is created. In line 4, the value of the string "middleName" is tested. When the value is null, line 5 is executed. Otherwise, line 7 is executed. In line 5, when the value of "middleName" is null, the value "N/A" is written into instance "m" in association with the key "middlename." In line 7, when "middleName" is not null, the string "username" is defined as the concatenation of "username" and "middlename."

In line 8, the value of username is stored within instance "m" in association with the key "username." Subsequently, in line 9, the value of "middlename" is read from instance "m" and assigned to the string "midname." In line 11, the database is written with the value of "midname" when the value of "midname" is not null as determined in line 10.

A test system reviews data-flows from both of the source statements corresponding to lines 1 and 2, to the sink statement corresponding to line 11. If untrusted data is written in line 11 without being subjected to a sanitizer method, a security vulnerability is detected. In the example, a security sensitive operation, i.e., line 11, is only executed when "midname" is not null. Since program code 300 does not write any received user input to instance "m" as "midname," the value stored in "m" as "midname" is either "N/A" from line 5 or null. The database operation of line 11 only writes a constant to the database. Thus, a correct evaluation of program code 300 by a test system is that program code 300 includes no security vulnerabilities from a data-flow analysis.

Conventional test systems, however, as discussed, lose track of data-flows through containers such as HashMaps and become conservative. The test system may decide that any value that is obtained from instance "m" is untrusted. For example, program code 300 may write data into instance "m" using one key and then read data out of instance "m" using another key. The conventional test system, however, may connect these unconnected operations as if part of one data-flow thereby generating a false positive.

Using a test system as described within this specification where a relational abstraction, e.g., a model container, for HashMap is used, the internal state of an instance of the model container is represented as a set of tuples with key constraints. The instance "m" is abstracted as an instance of a model container having a relation of arity 2, where index 0 is the key (i.e., the functional dependence is on the first element in every tuple). Operations are performed on the instance of the model container instead of on the instance "m." Accordingly, instance of the model container is manipulated by reading and/or writing the tuples therein.

Referring to program code 300, the initial state of "m" is { } (i.e., the empty set). After the conditional construct at lines 4-7, the state of the instance of the model container either remains empty or is the singleton {("middlename", "N/A")}. After line 8, the tuple ("username", ⊤) is added, where ⊤ denotes an untrusted input value. This suffices to establish, at line 11, that the database operation is benign. Though untrusted data is injected into the instance of the model container, the data read from the instance of the model container, and thus the actual instance "m," is not controlled by the user. As such, the database operation at line 11 using the data read from "m" is benign.

FIG. 4 illustrates an example of an incorrect data-flow interpretation by a conventional test system. The data-flow shown illustrates the situation that occurs when a conventional test system attempts to track a data-flow through an actual container. In the example shown, a write operation is performed using the key "key 1." A subsequent read operation is performed using the key "key 2." A conventional test system incorrectly determines that these operations are part of a same data-flow when, in fact, each operation belongs to a separate and different data-flow. As such, a single, but incorrect, data-flow interpretation is made. The conventional test system, behaving more conservatively in the face of the inability to track the data-flow through the container, generates a false positive for a security vulnerability regardless of whether the data read using the key "key 2" is untrusted.

FIG. 5 illustrates an exemplary instance of a model container 500. Model container 500 can include zero or more tuples that are accessed (written, read, deleted, etc.) as the program code under test is analyzed. Tuples within model container 500 are accessed by representative operations available per the specification described with reference to FIG. 2. For example, when a use of a container is detected within program code under test, the representative operation associated with the detected operation for the actual container is executed. The arguments (inputs) that would have been used by the detected operation are used by the representative operation. In this case, representative operations have been performed resulting in two tuples. Each tuple has a key and a value. The first tuple is formed of the key "key 1" and the value "john." The second tuple is formed of the key "key 2" and the value "⊤."

Using tuples within an instance of a model container allows the test system to track data-flows through the model container with greater accuracy than is attainable with an instance of the actual container. Further, the supporting operations of the actual container, which can be highly optimized and complex, need not be evaluated. In this case, the test system is able to accurately track data-flow 1 which writes and subsequently reads tuple 1. The write and read are readily detected and tracked since simple tuples are used without any obfuscation that is attendant with an actual instance of a container.

Data-flow 2 illustrates a situation in which a security vulnerability may be found. As shown, data-flow 2 accesses the second tuple using the key "key 2." In this example, rather than writing the actual value for the operation to tuple 2, the test system has determined that an untrusted input was received and written to the instance of the model container. Instead of writing the actual untrusted data to the tuple, the test system writes an identifier, e.g., ⊤, indicating that the data corresponding to "key 2" is untrusted. Accordingly, when data-flow 2 completes by virtue of a read using the key "key 2," the identifier is read indicating that untrusted data has been read or accessed from the instance of the model container. If the untrusted data is provided to a sink statement without being provided to a sanitizer, a security vulnerability is found within the program code under test by the test system.

Figure 6:
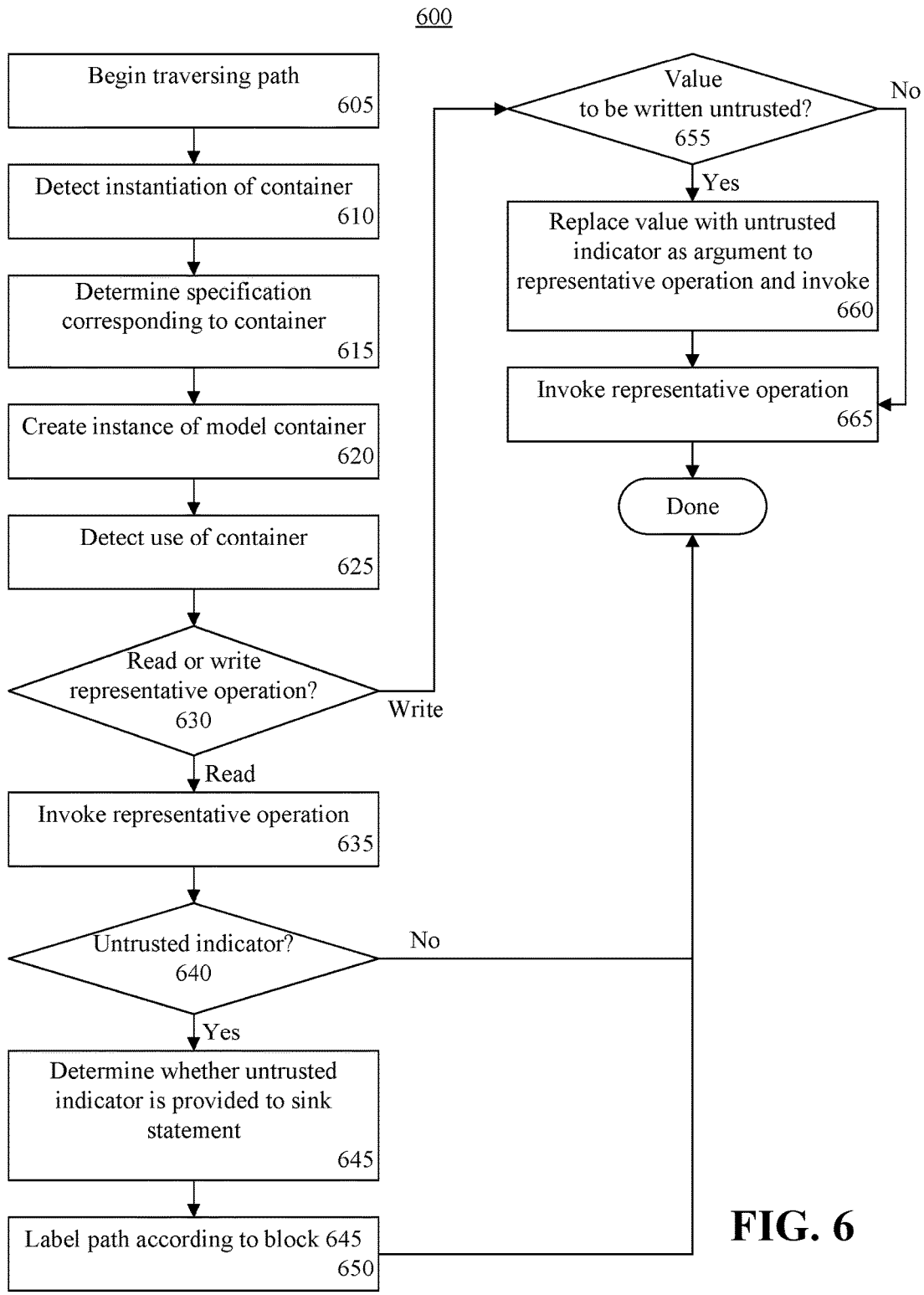
FIG. 6 is a flow chart illustrating an exemplary method of analyzing program code.

FIG. 6 is a flow chart illustrating an exemplary method 600 of analyzing program code. Method 600 illustrates a simplified example of analyzing and/or testing program code for security vulnerabilities. Method 600 is implemented by a system, e.g., a test system, as described with reference to FIGS. 1-3 and 5 of this specification. The system includes a testing application. The system further includes a mapping of containers with specifications as described with reference to FIG. 2.

In one aspect, method 600 is performed as a static analysis process in which program code under test is analyzed, but not executed. The model containers and supporting representative operations are executed for purposes of analyzing data-flows through containers. In another aspect, method 600 is performed as a runtime analysis process in which the program code under test is executed. The model containers and supporting representative operations can be performed in parallel with the execution of the program code under test or after execution of the program code under test.

Method 600 begins in a state where a CFG has been generated for the program code under test. As discussed, the CFG includes one or more paths with each path being defined as a connection between a source statement and a sink statement. The system further has selected a particular path of the CFG for analysis. While method 600 illustrates a simplified example of the analysis performed on a particular path of the CFG for the program code under test, it should be appreciated that method 600 can be iterated as may be required to analyze one or more additional paths. Further, for ease of illustration, use of a container is presumed within the path. If a container is not in the path, then a conventional security analysis of the path can be performed where model containers are not used.

In block 605, with the CFG generated, the system can begin to traverse the path. In block 610, the system detects the instantiation of a container within the program code under test. For example, an instruction that instantiates a container, e.g., creates an instance of the container. The container can be an enumerated type of container in that the container type is associated with a model container by a specification.

In block 615, the system determines or selects a specification corresponding to the container instantiated in block 610. As discussed, the system includes one or more specifications. Each specification is correlated with an enumerated container. Each enumerated container has a type. In one aspect, a one-to-one correspondence exists between a container and a model container based upon container type.

In block 620, an instance of a model container is created. The instance of the model container that is created is one indicated by the specification selected in block 615. The model container, when instantiated, initially includes no tuples, e.g., the empty set. The model container is configured to utilize only tuples as previously described, which simplifies the tracking of data-flows through the instance of the model container compared with the instance of the actual container instantiated in block 610.

In block 625, a use of the container is detected. For example, an instruction that access the instance of the container is detected. Examples of instructions that access the instance of the container include, for example, reads, writes, deletes, etc., which may be indicated in the specification selected in block 615 as a supporting operation of the particular type of container instantiated in block 610.

As part of block 625, the system can select a representative operation for the detected use (e.g., supporting operation) according to the specification. As discussed, the specification selected in block 615 lists a container with a corresponding model container. One or more or all operations available in support of the container are associated with a representative operation for the model container. The process of detecting a use of an instance of the container and performing parallel type operations with respect to the instance of the model container, as described generally within this specification and more specifically with reference to blocks 630-665 of FIG. 6, can be referred to as "tracking" a data-flow of the program code under test through the instance of the model container.

In block 630, the system determines whether the representative operation is a read or a write type of representative operation. If the representative operation is a read type of representative operation, method 600 continues to block 635. If not, method 600 continues to block 655. It should be appreciated that the representative operation will be the same, e.g., a read type or a write type, as the corresponding operation per the specification.

Proceeding with block 635, the representative operation is invoked and, as such performed by the test system. In block 640, the system determines whether the data read in block 635 is an untrusted indicator. If so, method 600 continues to block 645. If not, method 600 ends.

In block 645, the system determines whether the untrusted indicator is provided to a sink statement. In block 650, the system labels the path according to the determination made in block 645. If an untrusted indicator (or data) is provided to a sink statement, the path is labeled as having a security vulnerability. If the untrusted value is not provided to a sink, the path is not labeled as having a security vulnerability. After block 650, method 600 is done.

Continuing with block 655, the system determines whether the data that is to be written is untrusted. If so, method 600 proceeds to block 660. If not, method 600 continues to block 665. In block 660, the system replaces the data that is to be written to the tuple within the instance of the model container with an untrusted indicator.

In block 665, the representative operation is invoked. The particular data, whether an untrusted indicator when proceeding from block 660 or an actual data in the case of trusted data when proceeding from block 655, is written to the instance of the model container into a tuple. After block 665, method 600 ends. Accordingly, a subsequent read of the tuple that is written to the instance of the model container in block 665 will be either actual data or a particular untrusted indicator informing the system that the data read is untrusted.

Any results, e.g., path labels, that are generated as part of method 600 can be output from the system as a test result as pictured in FIG. 1. Each path, for example, can be specified as a source statement and a sink statement along with the label for the path.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method for analyzing program code, comprising:
   detecting an instance of a container within the program code;
   selecting a model container correlated with the container;
   creating, within memory, an instance of the model container; and
   tracking a data-flow of the program code through the instance of the model container instead of the instance of the container, wherein
   the model container is a relationship abstraction of the container.

2. The method of claim 1, wherein
   the tracking includes selecting, responsive to detecting a use of the instance of the container, a representative operation for the model container that is correlated with the use.

3. The method of claim 2, wherein
the representative operation is invoked after being selected.

4. The method of claim 2, wherein
the use is a read access of the instance of the container, and
a read type of representative operation for the model container is selected.

5. The method of claim 4, wherein
a determination is made whether data read from the instance of the model container using the read type of representative operation is an untrusted indicator.

6. The method of claim 2, wherein
the use is a write access of the instance of the container,
data to be written to the instance of the container is untrusted data,
a write type of representative operation for the model container is selected; and
an untrusted indicator is written to the instance of the model container instead of the untrusted data.

7. The method of claim 2, wherein
the instance of the model container consists of only one or more tuples.

8. The method of claim 7, wherein
each tuple consists of a key and a value associated with the key.

9. A computer-implemented hardware system configured to analyze program code, comprising:
a hardware processor configured to initiate the following executable operations:
  detecting an instance of a container within the program code;
  selecting a model container correlated with the container;
  creating, within memory, an instance of the model container; and
  tracking a data-flow of the program code through the instance of the model container instead of the instance of the container, wherein
the model container is a relationship abstraction of the container.

10. The system of claim 9, wherein
the tracking includes selecting, responsive to detecting a use of the instance of the container, a representative operation for the model container that is correlated with the use.

11. The system of claim 10, wherein
the representative operation is invoked after being selected.

12. The system of claim 10, wherein
the use is a read access of the instance of the container, and
a read type of representative operation for the model container is selected.

13. The system of claim 12, wherein
a determination is made whether data read from the instance of the model container using the read type of representative operation is an untrusted indicator.

14. The system of claim 10, wherein
the use is a write access of the instance of the container,
data to be written to the instance of the container is untrusted data,
a write type of representative operation for the model container is selected; and
an untrusted indicator is written to the instance of the model container instead of the untrusted data.

15. The system of claim 10, wherein
the instance of the model container consists of only one or more tuples.

16. The system of claim 15, wherein
each tuple consists of a key and a value associated with the key.

17. A computer program product, comprising:
a hardware storage device having stored therein computer instructions for analyzing program code,
the computer instructions, which when executed by a computer hardware system, cause the computer hardware system to perform:
  detecting an instance of a container within the program code;
  selecting a model container correlated with the container;
  creating, within memory, an instance of the model container; and
  tracking a data-flow of the program code through the instance of the model container instead of the instance of the container, wherein
the model container is a relationship abstraction of the container.

18. The computer program product of claim 17, wherein
the tracking includes selecting, responsive to detecting a use of the instance of the container, a representative operation for the model container that is correlated with the use.

19. The computer program product of claim 17, wherein
the representative operation is invoked after being selected.

20. The computer program product of claim 17, wherein
the use is a read access of the instance of the container, and
a read type of representative operation for the model container is selected.

* * * * *